Sept. 16, 1947.   P. H. SCHWEITZER   2,427,370
APPARATUS FOR INDICATING CYCLIC PRESSURE FLUCTUATIONS
Filed Aug. 29, 1944   7 Sheets-Sheet 3
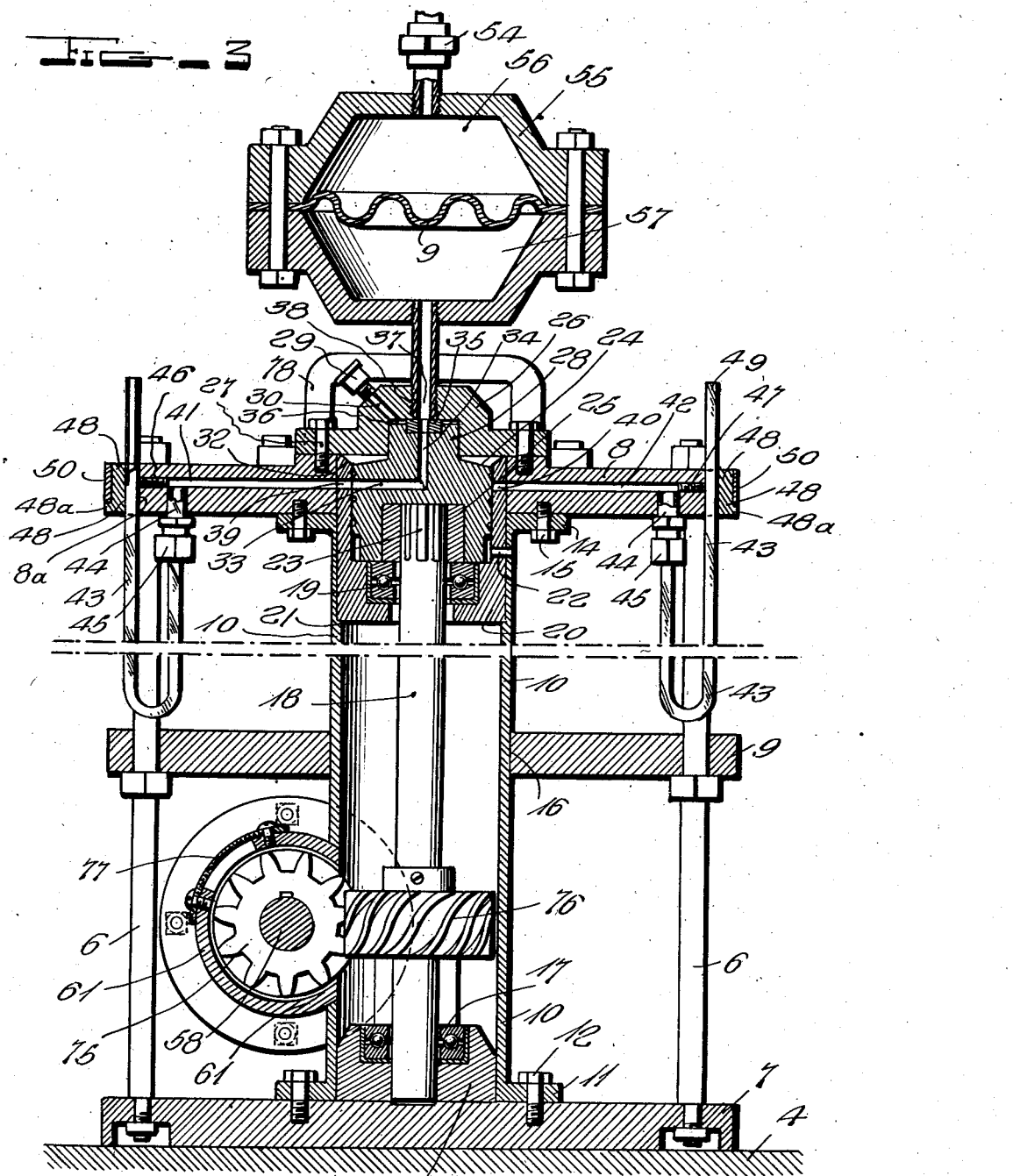
INVENTOR.
P. H. Schweitzer,
BY
John B. Brady
ATTORNEY

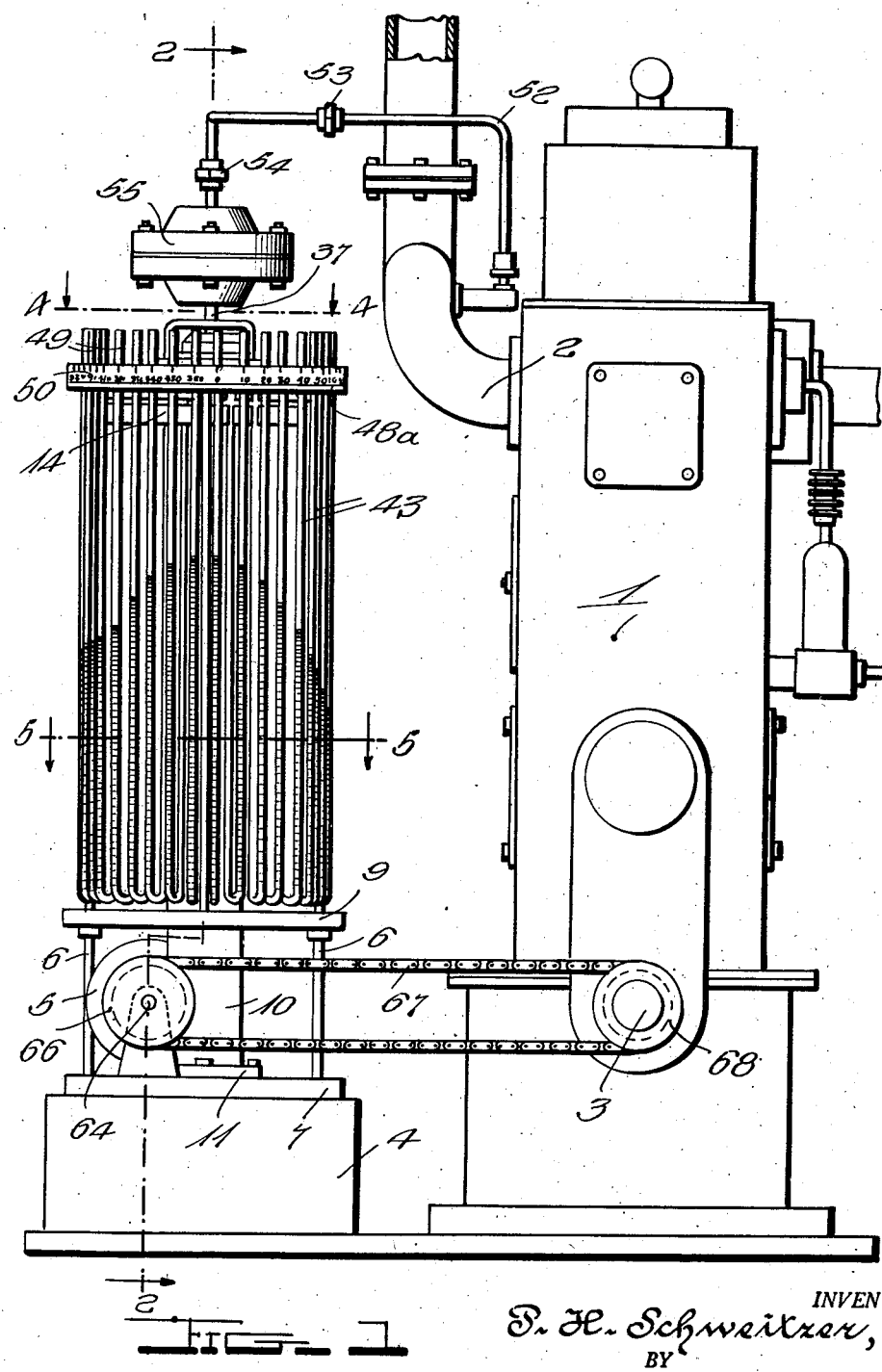

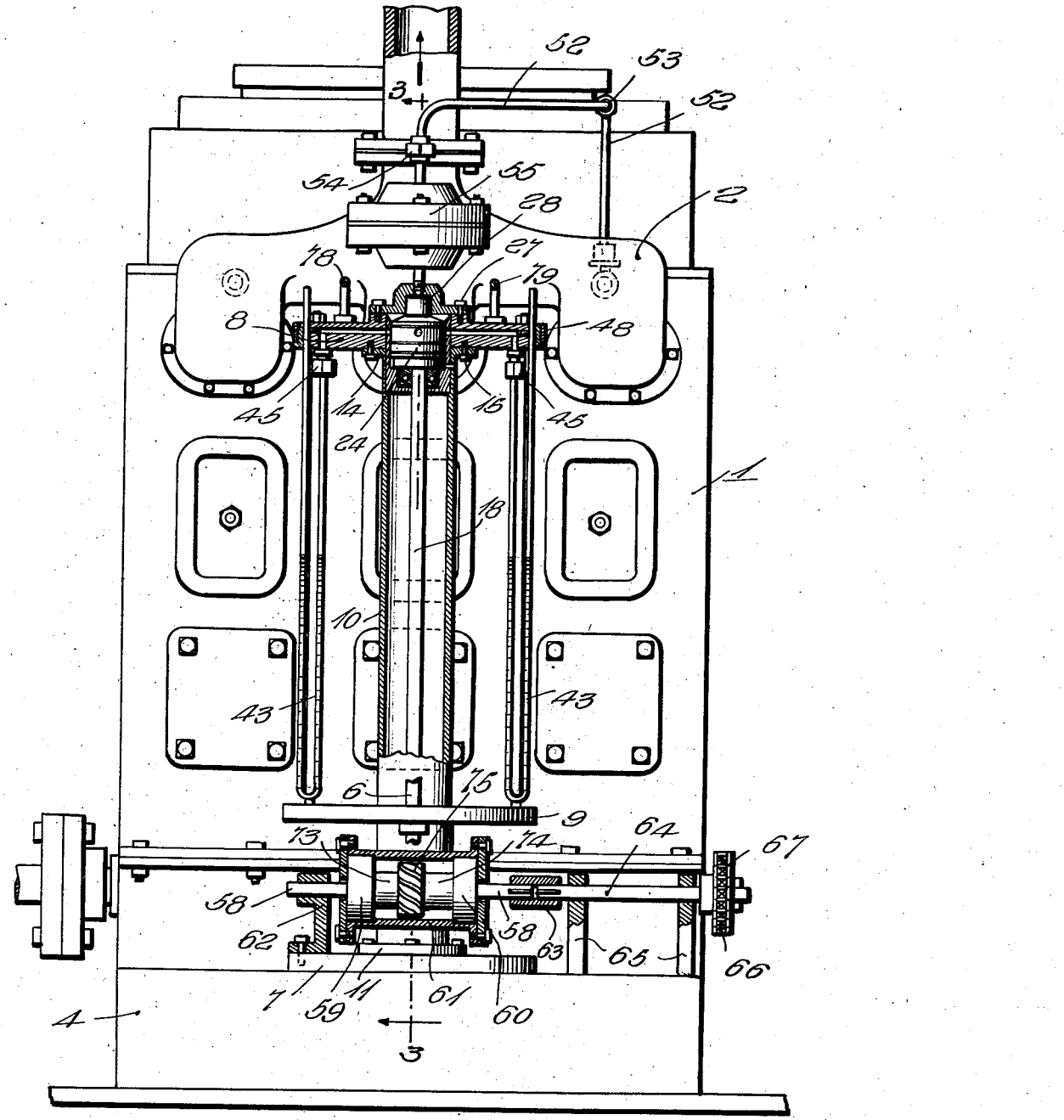

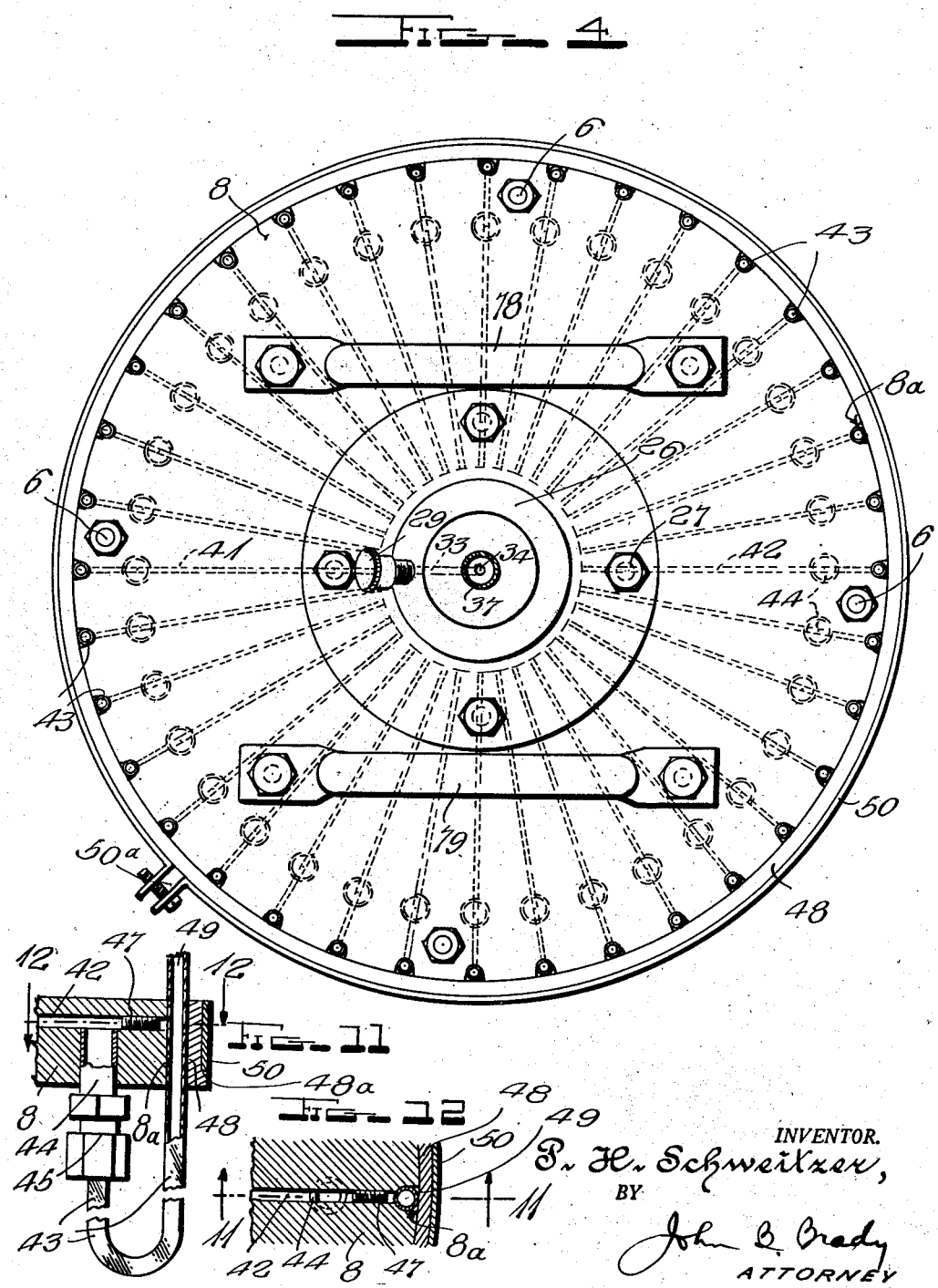

Sept. 16, 1947. P. H. SCHWEITZER 2,427,370
APPARATUS FOR INDICATING CYCLIC PRESSURE FLUCTUATIONS
Filed Aug. 29, 1944 7 Sheets-Sheet 5
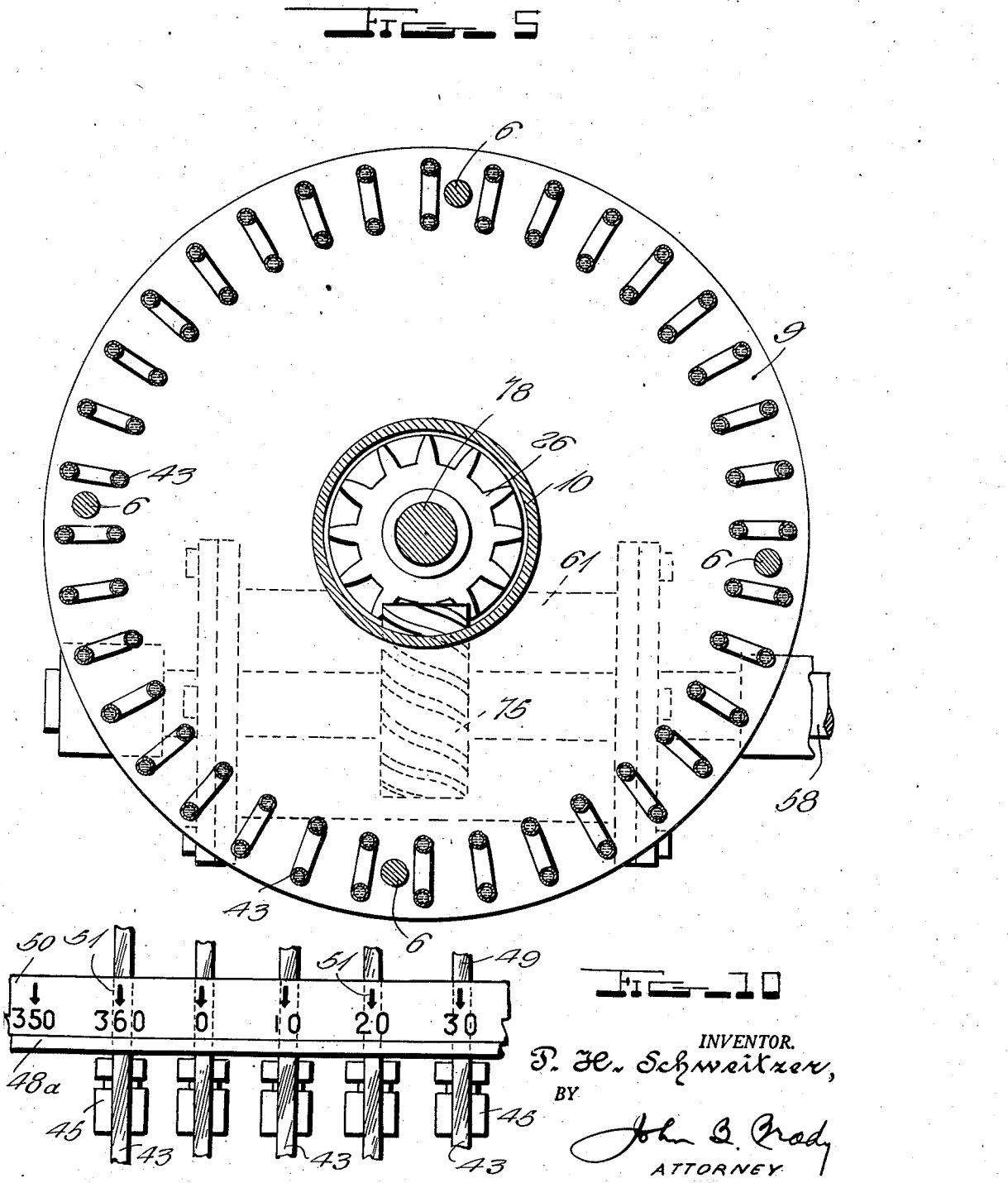
INVENTOR.
P. H. Schweitzer,
BY
John B. Brady
ATTORNEY

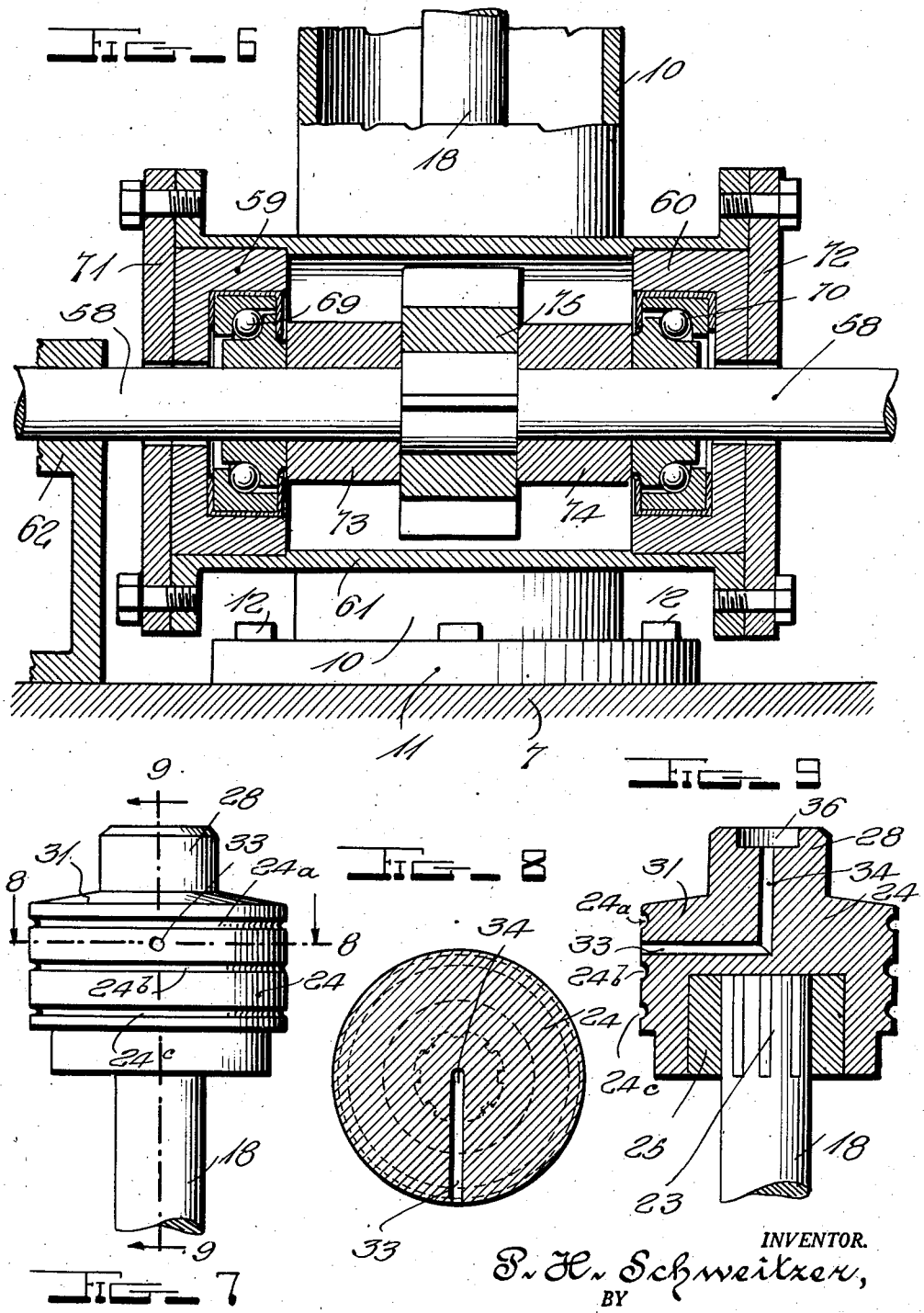

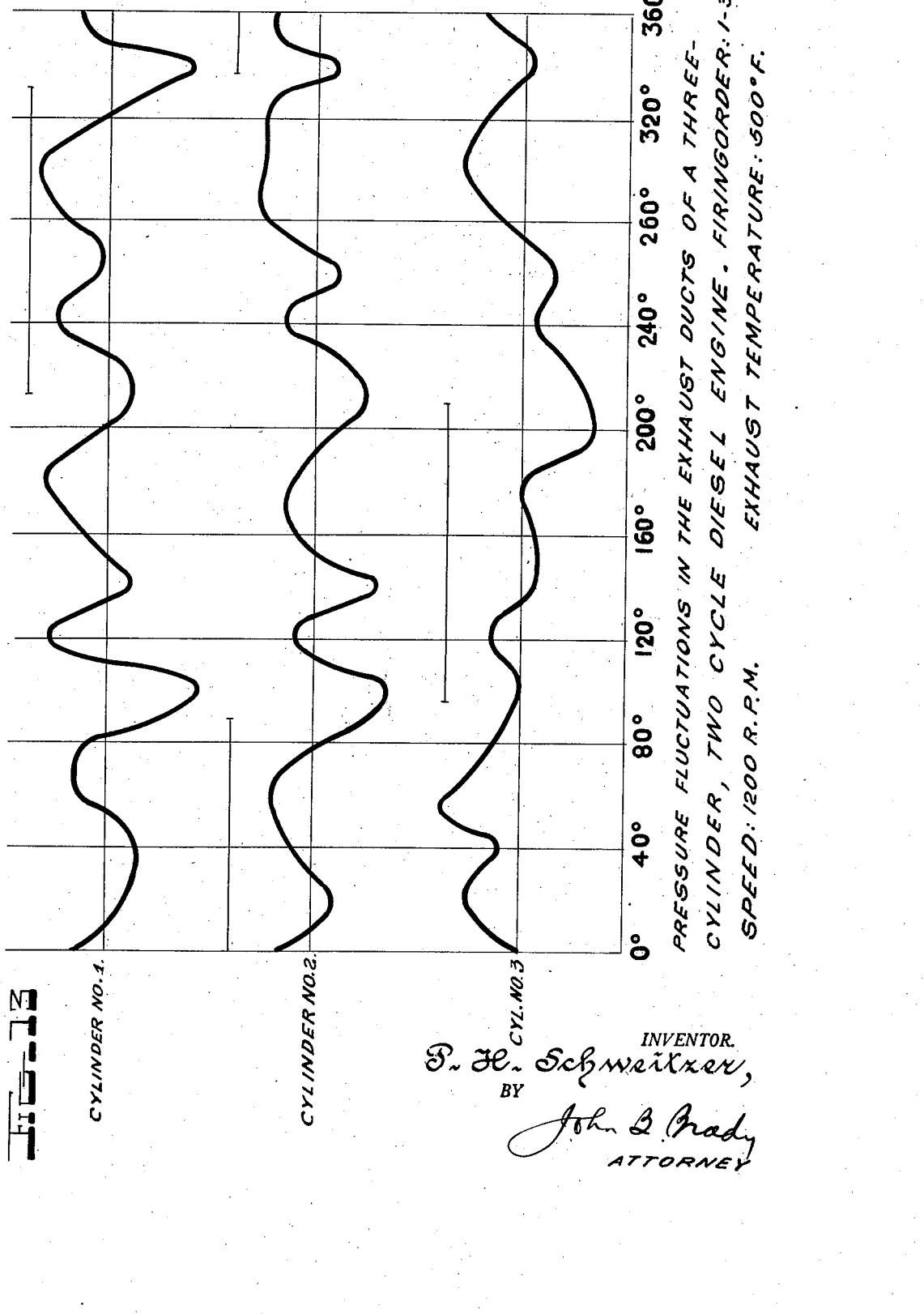

Patented Sept. 16, 1947

2,427,370

UNITED STATES PATENT OFFICE 2,427,370

APPARATUS FOR INDICATING CYCLIC PRESSURE FLUCTUATIONS

Paul H. Schweitzer, State College, Pa.

Application August 29, 1944, Serial No. 551,712

13 Claims. (Cl. 73—116)

My invention relates broadly to apparatus for determining and indicating the performance of pressure fluctuating systems and more particularly to an improved construction of indicator for visually indicating cyclic pressure fluctuations in any source of fluctuating pressure.

One of the objects of my invention is to provide an improved apparatus for selectively correlating instantaneous cyclicly recurring pressures with the phase angle of an associated rotatable shaft.

Another object of my invention is to provide an improved apparatus for exhaust pipe tuning for engines, for visually indicating cyclicly recurring instantaneous pressures in engine cylinders, exhaust pipe, intake pipe, carburetor, receiver, silencer, snubber, etc., of engine systems.

Still another object of my invention is to provide a construction of indicator for determining the characteristics of multiple cylinder engines in which a multiplicity of manometer tubes are correlated with the cylinders of a multiple cylinder engine through a phasing valve by which indications of instantaneous cylinder pressure compared with the phase relation of crank shaft rotation may be visibly indicated.

A further object of my invention is to provide a construction of valve mechanism for selectively correlating a multiplicity of manometer tubes with the phase relation of the engine crank shaft for visibly indicating the engine characteristics.

A still further object of my invention is to provide a construction of phasing valve for use in association with a multiplicity of manometer tubes and a multiple cylinder engine whereby the instantaneous pressure effects in the several engine cylinders may be impressed upon selected manometer tubes arranged in predetermined order for visibly indicating cyclicly recurring pressures in the engine cylinders in relation to the phase angle of the engine crank shaft.

Another object of my invention is to provide apparatus for visually indicating cyclicly recurring instantaneous pressures corresponding to the phase angle of an associated rotating shaft.

Other and further objects of my invention reside in the construction of cyclicly operating pressure indicator as set forth more fully in the specification hereinafter following by reference to the accompanying drawings in which:

Figure 1 is a side elevational view showing the indicator system of my invention applied to an engine of the two-cycle Diesel type, the indicator being connected to the exhaust duct of cylinder No. 1; Fig. 2 is a vertical sectional view taken on line 2—2 of Fig. 1 and illustrating the means of correlating the indicator system with the phasing of the engine crank shaft; Fig. 3 is a vertical sectional view on an enlarged scale taken substantially on line 3—3 of Fig. 2, the view being foreshortened to show on a larger scale the arrangement of the flexible diaphragm connection with the exhaust manifold for excluding from the indicator system the sooty mass of exhaust gases typical of Diesel engines; Fig. 4 is a horizontal sectional view on an enlarged scale taken on line 4—4 of Fig. 1; Fig. 5 is a horizontal sectional view on an enlarged scale taken through the manometer tubes and pressure control mechanism on an enlarged scale on line 5—5 of Fig. 1; Fig. 6 is an enlarged sectional view of the driving means provided for driving the vertically extending rotor shaft of the control mechanism of the indicating system; Fig. 7 is a side elevational view of the rotor valve; Fig. 8 is a horizontal sectional view taken on line 8—8 of Fig. 7; Fig. 9 is a transverse vertical sectional view taken on line 9—9 of Fig. 7 and illustrating more particularly the phasing passage in the rotor valve; Fig. 10 is a fragmentary elevational view illustrating more particularly the movable scale which coacts with the manometer tubes; Fig. 11 is a detailed vertical sectional view taken on line 11—11 of Fig. 12; Fig. 12 is a fragmentary horizontal sectional view taken on line 12—12 of Fig. 11; and Fig. 13 shows a series of characteristic curves designating the fluctuations in pressure in cylinders 1, 2 and 3 of a typical two-cycle Diesel engine throughout the engine cycle of from 0 to 360° crank shaft rotation, the firing order being one, three, two, etc.

The most neglected field of two-stroke cycle engine design pertains to the exhaust systems. This neglect is fully reflected in the almost complete absence of American literature on the subject. This is the more deplorable as a properly designed exhaust system does not usually involve added weight or added complications and yet it improves engine performance all around. Even engines already installed could be improved by "tuning" their exhaust. Exhaust system design with regard to pressure waves is now in a status analogous to that of crankshaft design twenty years ago with regard to torsional vibrations. Considerable information has been discovered, but it has not spread widely enough and is generally ignored by the practical designers and installation men.

To be on the "safe" side, exhaust pipes are frequently oversized. But an oversize exhaust pipe is no better guarantee against undesirable synchronism than an oversize crankshaft is. Synchronism in torsional vibrations results in crankshaft breakage. Synchronism in pressure waves results in poor scavenging, reduced air charge, low power output, high fuel consumption and high exhaust temperatures. By avoiding the "criticals" the crankshaft is safe from torsional failure. By avoiding synchronism of pressure waves with engine speed poor filling of the cylinder and resultant power loss is avoided. But the pressure waves of appropriate frequency may be harnessed and thereby gain powerful assistance in scavenging and charging the cylinder. The result is higher output, lower fuel consumption, lower exhaust temperatures, lower piston and cylinder head temperatures, reduced maintenance and longer life. The difference between a well tuned and poorly tuned exhaust system is sometimes thirty per cent in engine output.

The exhaust system is frequently evaluated on the basis of the exhaust back pressure. But the exhaust back pressure as read on a manometer or pressure gauge attached to a certain point of the exhaust pipe is not significant because the actual exhaust pressure at any one point fluctuates during the cycle and the reading is only a rough average. Yet it is not this average which controls the charging and scavenging but the actual pressures during the scavenging period. The engine which has low (still better, sub-atmospheric) exhaust pressures during most of the scavenging period will give a better performance than one with high exhaust pressures, although the manometer reading of the exhaust pressure will be the same.

If no exhaust pipe were used, evidently the pressure at the exhaust opening would constantly be atmospheric. If a pipe is used, the sharp impulse initiated when the high pressure cylinder gases are put in communication with the exhaust pipe, sets up pressure waves of appreciable magnitude which travel back and forth in the pipe with the velocity of sound. The pressure next to the exhaust opening will rise and fall in accordance with the natural frequency of the system but with declining amplitudes until a new impulse from the subsequent opening of the exhaust is superimposed on the existing pressure waves. The effect of these pressure fluctuations on the scavenging and charging process may be favorable or unfavorable, depending on the timing of the waves which in turn depends on the geometry of the exhaust system.

If the natural frequency of the exhaust column is exactly equal to the number of engine revolutions per second, the pressure wave will so adjust itself that the rise will regularly coincide with the exciting impulse. This is undesirable, as it makes the pressure peaks in the exhaust duct coincide with the opening of the exhaust. The pressure wave will "buck" the exhaust and also the subsequent intake. This same effect will occur if the natural frequency of the exhaust is twice the engine revolutions per second.

In order to secure favorable exhaust conditions the period of natural oscillations should approximately equal the scavenging period. A partial vacuum will then exist during the latter part of the scavenging period, which is very helpful in drawing fresh air into the cylinder through the intake port. The depression should taper out when approaching exhaust closure, so that the scavenged cylinder may then fill up with fresh air rather than have this air sucked out again by the exhaust pipe vacuum.

The "tuning" of the exhaust system depends chiefly upon its geometry, that means on the length and diameter of the exhaust pipes and on the volume of the various containers attached or interposed in the exhaust system. If an exhaust system is tuned it stays tuned irrespective of load and operating conditions. The only exception is a change in speed. An engine can be tuned for one speed only and, therefore, tuning has the greatest significance for constant speed engines. Variable speed engines should be tuned to the speed at which optimum performance is desired. This may be the most common operating speed or the speed corresponding to the maximum power output.

Being aware of the importance of the exhaust tuning the practical problem is how to create favorable exhaust conditions for a given engine at a given speed. Three methods will be described in the following specification: 1. Performance test method; 2. Analytical method; 3. Pressure indicating method. Often a combination of the methods will be found advantageous.

Performance test method

Exhaust tuning affects such important performance characteristics as maximum power output, specific fuel economy, air delivery and exhaust temperature. In a most direct method, therefore, some such performance characteristics would be measured while the tuning of the exhaust system is being varied. Then the tuning which gives best engine performance would be selected.

This method can be applied very successfully to a small engine. S. Belilove, in an article entitled "Improving two-stroke cycle engine performance by exhaust pipe tuning," Diesel Power and Diesel Transportation 21(7): 608–613, July 1943, measured the air delivery ratio (volume of air delivered to the cylinder divided by the piston displacement) and the power output of a ¾ horse power Evinrude outboard engine while he varied the length of the ¾ inch exhaust pipe (inside diameter $1\frac{3}{16}$ inch). It was simple to conclude that a twenty-eight inches long pipe was the best for that engine at 2800 R. P. M.

For large engines it is not always feasible to measure power, air consumption or specific fuel consumption because of lack of equipment. The measuring of the exhaust temperature alone without power measurement is inadequate. Making numerous changes on a bulky exhaust system is costly and time consuming. Another unattractive feature of this method is that one or two measurements do not disclose how near the system is to optimum tuning and in which direction the optimum will be found. Therefore, the principal role of this method lies in checking the results obtained by other means.

Analytical method

Taking advantage of such theoretical work as was done by T. Schmidt reported in an article entitled "Schwingungen in Auspuffleitungen von Verbrennungsmotoren," V. D. I. Dieselmaschinen, VI, 1936, p. 79, and J. Zeman, reported in an article entitled "Baugrenzen von Zweitakt-Dieselmaschinen mit Kurbelkasten Spurlpumpe," V. D. I. Dieselmaschinen, VI, 1936, p. 142, in Germany, and H. G. Farmer, set forth in an article entitled "Exhaust systems of two-stroke engine," The Institution of Mechanical Engineers, Proceedings, vol. 143, p. 369, 1938, and G. F. Mucklow, described in an article entitled "Exhaust pipe phenomena," The Manchester Association of Engineers, Nov. 21, 1942. The problem of exhaust tuning can be made accessible to analytical calculations. In this manner the exhaust system can be tuned before it is built, saving much time and expense. In the following, methods of calculating exhaust systems are to be presented in a simplified manner, ignoring the derivations of the formulae and preceding theoretical work.

The frequency of the gas column oscillations in the exhaust system is determined primarily by the length of the exhaust pipe and secondarily by its diameter and the volumes interposed in the system. Therefore, it is reasonable to start the calculations by selecting the diameter of the main exhaust pipe. If the exhaust pipe cross section is inadequate the exhaust will be throttled irrespective of its tuning. If it is too large, the amplitude of the pressure waves will be small and the effect of tuning will thereby be minimized. That is an advantage if the tuning is incorrect but a disadvantage if it is correct. The tendency in the past has been to use oversized exhaust pipes for two-stroke cycle engines, presumably just to be on the safe side and avoid the effects of the "incalculable" pressure waves.

There is little beyond thumb rules to guide one in the selection of the diameter of the exhaust pipe. To avoid throttling, the gas velocity in the pipe or duct must be lower than in the exhaust ports, preferably a third less. In multicylinder engines the gas velocity in the common header or exhaust pipe should be still lower. Burgess Battery Company, makers of exhaust snubbers recommend fifty feet per second for crank-case scavenged engines; from sixty-five to one hundred and fifteen feet per second; for low-speed (up to 350 R. P. M.) separately scavenged engines; from one hundred to one hundred and fifty feet per second, for medium-speed (350 to 1200 R. P. M.); and from one hundred and thirty-five to one hundred and sixty-five feet per second for high-speed (above 1200 R. P. M.) two-stroke cycle engines. In calculating the conduit size from the permissible gas velocities, it must be taken into account that the volume of the exhaust gas is about double the volume of the intake air, based on the ratio of absolute temperatures.

*Example.*—A 16-cylinder 8½ x 10 inches 800 R. P. M. engine has an air-delivery ratio of 1.325 and a gas temperature (in the exhaust pipe) of 500 degrees F. at full load. What is the required size for the exhaust pipe? The exhaust gas volume is $$1.325 \times 16 \times \frac{8.5^2 \pi}{4} \times 10 \times \frac{800}{1728} \times \frac{460+500}{460+150} = 8700$$

cubic feet per minute.

Allowing an average gas velocity of 150 feet per second, the cross section of the common exhaust pipe must be $$A = \frac{8700 \times 1728}{60 \times 150 \times 12} = 139 \text{ square inches}$$

so that the inside diameter of the conduit is to be 13.3 inches. The next standard pipe size is 14 inches nominal inside diameter.

After the size of the exhaust pipe has been selected, its tuning will be effected by adjusting its length and the volumes interposed in the system. The controlling factor in the calculations is the natural frequency of the pressure waves.

*Pressure waves*

The pressure waves in the exhaust pipes are similar to the sound waves in organ pipes and are controlled by identical laws. In a plain pipe closed at both ends the period of the pressure waves is $2L/a$ where L is the length of the pipe and $a$ is the velocity of the sound in the gas. The value of $a$ varies with the gas temperature according to the formula $$a = C\sqrt{kpv} = C\sqrt{kRT}$$

where $k$ is the ratio of the specific heats of the gas, $p$, $v$, and $T$ its mean pressure, specific volume and absolute temperature in the pipe, and $C$ a constant which decreases in straight line relationship inversely as the bore of the pipe.

For an exhaust system consisting of a single pipe of uniform cross section attached at one end of the exhaust ports, the other end being open to the atmosphere, the period of gas column vibration is about double, that is $4L/a$. The reason for this is that the pressure wave is reflected at the open end of the pipe with sign reversed. The period of this negative wave is also $2L/a$ and, therefore, the total time of the complete cycle is $4L/a$.

In calculation of pressure waves in pipes it is customary to replace the oscillating system with a pipe of length $L_e$ of uniform cross section closed at both ends which has the same frequency or period as the oscillating system. This is called the equivalent pipe length. For a plain exhaust pipe of uniform cross section throughout and open to the atmosphere, the equivalent pipe length is $$L_e = 2(L + C_R)$$

where L is the actual length of the pipe and $C_R$ the so called Raleigh correction. Since the reflection does not take place exactly at the open end, an additional length roughly equal to 0.4 times the inside diameter of the pipe is added to the actual pipe length. Except with very short pipes the Raleigh correction is relatively small and may be neglected, therefore (1) $\qquad L_e = 2L$ Using the convenient concept of the equivalent pipe length, the complete natural period of the vibration of the gas column always is (2) $\qquad t = \frac{2L_e}{a}$ Consequently, if the exhaust port of the engine is connected through a plain pipe of the length L to the atmosphere, the period of the exhaust column vibration will be $t = 4L/a$.

*Example.*—The single cylinder 1⅜" x 1⅜" Evinrude engine, mentioned hereinbefore has (article by S. Belilove, supra) its exhaust ports open at 107° after top center and closed at 253° after top center, therefore, a port opening period of 146 degrees. The 1¾" I. D. exhaust pipe is directly attached to the exhaust ports. What will be the worst length for the exhaust pipe and what will be the best for 2800 R.P.M.?

Assuming a mean temperature of 175° C. in the exhaust pipe, a propagation velocity of 14,700 inches per second can be determined from a curve analysis.

The worst gas column frequency will be the one which is equal to the engine frequency, whose period is $$t_w = \frac{60}{2800} = \frac{1}{465} \text{ sec.}$$

The equivalent pipe length which gives this frequency to the system is from Equation 2 supra.

$$L_{ew} = \frac{at_w}{2} = \frac{14700}{2 \times 465} = 158.5 \text{ in.}$$

The actual pipe length will be from Equation 1 supra $$L_w = \frac{L_{ew}}{2} = \frac{158.5}{2} = 79.25 \text{ in.}$$

The best gas column frequency should be the one which gives a period equal to the port opening period. The latter is $$t_b = \frac{146}{360} \frac{60}{2800} = \frac{1}{1110} \text{ sec.}$$

The equivalent pipe length is $$L_{eb} = \frac{at_b}{2} = \frac{13800}{2 \times 1110} = 62 \text{ in.}$$

(The lower propagation velocity of 13800 inches per second corresponds to the lower mean exhaust gas temperature of 125° C. which is more likely with optimum tuning.) The best actual pipe length then is $$L_b = \frac{62}{2} = 31 \text{ in.}$$

Frequently the location of the engine is such that the desirable pipe length is not sufficient to reach the outside atmosphere. In such case a large exhaust pit or expansion chamber can be used in place of the atmosphere at the end of the exhaust pipe, and the expansion chamber can be connected to the atmosphere by a tail pipe. The length of the latter is immaterial and will have no effect on the pressure waves in the primary exhaust pipe, provided that its cross section is large enough to keep the pressure in the expansion chamber substantially atmospheric. A rule will be given later in the test for the size of the expansion chamber and the minimum diameter of the tail pipe.

However, ordinarily the exhaust pipe does not connect to the exhaust ports directly, but a duct sleeve or chamber of a certain volume is placed between the exhaust ports and the exhaust pipe. The volume next to the exhaust ports will affect the exhaust tuning in either case and can be termed the "exhaust pot" even if it consists only of a small enlargement over the exhaust pipe cross section. The size of the expansion chamber and tail pipe does not affect the tuning if both are large enough to keep the pressure in the expansion chamber substantially atmospheric.

The equivalent pipe length of such a system has been calculated by Thomas Schmidt, supra, and can be expressed by the following formula:

$$(3) \qquad \tan \frac{\pi L}{L_e} = \frac{A L_e}{\pi V_1}$$

where $L$ is the actual, $L_e$ the equivalent pipe length, $A$ is the cross sectional area of the exhaust pipe and $V_1$ the volume of the exhaust pot close to the engine.

The equivalent pipe length (and therefore, the natural frequency of the exhaust system) is determined not by the pipe length alone, but also by its cross section and the volume between the engine and the exhaust pipe. Even a small volume increases the equivalent pipe length considerably. For instance in the example treated above, an exhaust pot of only twenty-six cubic inches between the engine and a twenty-five inch exhaust pipe will increase the equivalent pipe length from fifty-one inches to one hundred and twenty-one inches.

In using Formula 3 supra, the exhaust pot volume should include any enlargement found beyond the exhaust port such as ducts, sleeves, etc., but only the volume in excess of the corresponding exhaust pipe should be counted. The actual exhaust pipe length should be counted from the cylinder to the atmosphere or the large expansion chamber, and to that the Raleigh correction of $0.4 \times$ I. D. may be added.

*Example.*—A 7.9 x 11.8-inch, one cylinder, eighteen horse power crankcase-scavenged engine operating normally at 370 R. P. M. has an exhaust opening period of 136 degrees crank angle. The exhaust ports connect directly into an exhaust pot of 2000 cubic inches volume. From this an exhaust pipe of 5.35 inches I. D. leads to the atmosphere. What is the worst exhaust-pipe length, and what is the best?

The worst frequency is that equal to the engine frequency which corresponds to a period of $$t_w = \frac{60}{370} = \frac{1}{6.15} \text{ second}$$

The corresponding equivalent pipe length is from Formula 2

$$L_e = \frac{at_w}{2}$$

With an estimated mean exhaust gas temperature of 210° F., the propagation velocity of the pressure waves is 14,900 inches per second and, therefore, $$L_e = \frac{14900}{2 \times 6.15} = 1210 \text{ inches}$$

The ratio $V_1/A = 2000/22.5 = 89$ inches, which gives the actual pipe length of 515 inches less $0.4 \times 5.35 = 2.14$ inches Raleigh correction, therefore, $$L_w = 513 \text{ inches}$$

This would be the worst pipe length.

The best frequency is that which corresponds to the period of exhaust duration, which is $$t_b = \frac{136}{6 \times 370} = \frac{1}{16.33} \text{ seconds}$$

and the corresponding equivalent pipe length $$L_e = \frac{at_b}{2} = \frac{14900}{2 \times 16.33} = 456 \text{ inches}$$

From a curve diagram using $V_1/A = 89$ inches, 150 inches is obtained for the pipe length applying again the Raleigh correction $$L_b = 148 \text{ inches}$$

as the best pipe length.

T. Schmidt (supra) has tried out a number of pipe lengths with the foregoing type of engine and accurate records were taken. He found a 490 inch pipe length very bad and a 132 inch length very good. This shows that the calculation is not perfect, probably because of the uncertainty of estimating the mean exhaust temperature of the line, the existence of residual pressure waves and other minor factors. Nevertheless, with a simple exhaust system the calculation can be depended on to give fairly close results.

*Large expansion chamber*

The foregoing calculation is correct for pipe-like exhaust system where the main exhaust pipe connects to the atmosphere or to an expansion chamber sufficiently large to maintain substantially atmospheric pressure at the end of the exhaust pipe. This expansion chamber ordinarily connects through a tail pipe to the atmosphere and this tail pipe must be of such size as to prevent throttling of the exhaust gases. The following rules may be used to select the size of the tail pipe and of the expansion chamber.

The manometric back pressure in the expansion chamber should not exceed ten inch water. The pressure drop per one hundred feet of pipe can be expressed as $$h = \frac{Q^2 L}{4430 \, d^5} \text{ inch water}$$

where $Q$ is the volume of the exhaust gas cubic feet per minute, $d$ the diameter of the tail pipe in inches and $L$ its length in feet.

The size of the expansion chamber should not change the natural period of the exhaust system by more than five per cent. Conforming to this requirement, the secondary exhaust pot or expansion chamber must be at least about ten times larger than the primary exhaust pot in order to be equivalent to the atmospheric pressure.

Small expansion chamber

When secondary exhaust pot or expansion chamber is relatively small, it will affect the natural frequency of the oscillating system. T. Schmidt (supra) developed the calculation for this case also and the resulting formula is as follows:

$$\tan \frac{\pi L}{L_e} = \frac{\frac{A}{V_1} + \frac{A}{V_2}}{\frac{\pi}{L_e} - \frac{L_e}{\pi} \frac{A^2}{V_1 V_2}}$$

Where:

$L$ equals length of exhaust pipe
$L_e$ equivalent length of exhaust pipe determined as above
$A$ equals area of exhaust pipe
$V_1$ equals volume of chamber at one end of exhaust pipe
$V_2$ equals volume of chamber at opposite end of exhaust pipe This formula is rather complicated and its use is preferably avoided by increasing the relative size of $V_2$.

Another system may be used with a single exhaust pot in the middle of the exhaust pipe, for which the following equation is valid:

$$\operatorname{ctn} \frac{\pi L_2}{L_e} - \tan \frac{\pi L_1}{L_e} = \frac{\pi V}{A L_e}$$

*Example.*—Four pressure diagrams of a typical exhaust pipe may be considered, presenting successively deteriorating tuning. The only variable in the setup is the size of the expansion chamber $V_2$. In order to equal the performance with no expansion chamber, Schmidt (supra) had to supply an expansion chamber of 0.6 m³=36,000 cubic inches. The expansion chamber would have to be seventeen times the primary exhaust pot or 17×2000 cu. in.=34,000 cubic inches which checks closely with the experimental value. By reducing the secondary volume to 13,300, 8,600 and 1,840 cubic inches respectively, performance deteriorated, as it is illustrated by the specific fuel consumption and exhaust temperature. The foregoing example contemplates substantially constant power output during the series of tests.

Doubling the period

If the optimum exhaust pipe length is too short for structural reasons, even when used in conjunction with an expansion chamber, favorable results can also be obtained by multiplying the equivalent pipe length by two.

*Example.*—A 12 x 15″, 367 R. P. M. crankcase scavenged engine had an 8 inch I. D. exhaust pipe discharging into the open. It had a 78½ inches long muffler, close to the engine, with a volume of 8,550 cubic inches. The average exhaust gas temperature was estimated at 464 degrees F. and the exhaust per opening period 135 degrees crank angle.

The exhaust-pipe cross section was $8^2 \pi / 4 = 50.3$ square inches. Since the muffler was in the line, the replaced pipe volume 50.3×78.5=3950 cubic inches had to be deducted, giving an effective exhaust pot volume of $V_1$=8550−3950=4600 cubic inches and $V_1/A$=4600/50.3=91.5 inches.

The worst frequency is the one equal to the engine frequency, which had a period of $t_w$= 60/367=1/6.125 seconds. With a sound velocity of 17,800 inches per second, the equivalent pipe length is $$L_e = \frac{a t_w}{2} = \frac{17,800}{2 \times 6.125} = 1452 \text{ inches}$$

From Formula 3 the actual pipe length corresponding to this with $V_1/A$=91.5 inches is $$L_w = 640 \text{ inches}$$

This would be the worst pipe length. For best pipe length the required period is $$t_b = \frac{135}{6 \times 367} = \frac{1}{16.25} \text{ seconds}$$

which would give an equivalent pipe length of $$L_e = \frac{a t_b}{2} = \frac{17,800}{2 \times 16.25} = 550 \text{ inches}$$

or an actual pipe length of 190 inches, which was considered too short to reach from the building to the open; therefore, the equivalent pipe length is doubled, making 1100 inches. With this the actual pipe length turns out to be 460 inches as most favorable.

According to tests made on this engine by K. C. Whitefield reported in an article entitled "Improving Diesel engine operation by the selection of proper exhaust pipe length," University of Wisconsin, Thesis, 1933, the worst pipe length was 600 inches and the best 456 inches, which is very good agreement, indeed.

Multicylinder engines

The above formulae are strictly applicable only for either single cylinder engines or multicylinder engines with individual exhaust pipes to the atmosphere or to a large expansion chamber. The last arrangement is quite common with an exhaust pit under the floor into which the individual exhaust pipes connect. If the volume of the exhaust pit exceeds the size determined by the foregoing and it connects with a large enough tail pipe to the open, the multicylinder engine can be treated as so many single cylinder engines as far as exhaust tuning is concerned.

Frequently, however, the individual exhaust pipes combine by T's or Y's before reaching the atmosphere or expansion chamber. In other cases no individual exhaust pipes are used at all only a common header or exhaust manifold. These cases are not easily accessible to calculation because the exhaust impulse from one cylinder interferes with the residual pressure waves set up by another cylinder. To evade this difficulty the exhaust manifolds sometimes combine not more than two or three cylinders the firings of which are at least 120 degrees crank angle apart and these manifolds in turn are led into an exhaust pit or expansion chamber. The complication of such an arrangement with a large number of cylinders is readily understandable.

When exhaust headers or manifolds are used in a multicylinder engine, it is advisable not to depend on calculations alone for tuning. The indicating method, on the other hand, is applicable to any number of cylinders and its intelligent use greatly improves efficiency.

Indicating method

It was pointed out that the pressure record near the exhaust port of a well tuned exhaust may comprise a series of deteriorating curves such as 1, where a nice negative loop may end at about the exhaust closure; 2, where the negative loop is still pronounced but ends a little too early; 3, where the negative loop almost vanishes during the scavenging period; and finally 4, where positive pressure persists during the whole scavenging period and poor tuning is evident.

Therefore, if reliable pressure diagrams of the exhaust of each cylinder are available, by their inspection the quality of the exhaust tuning can easily be determined. If the tuning is not satisfactory, slight changes in the geometry of the exhaust system (size and lengths of ducts and pipes, volumes of ducts, chambers and silencers) should improve it. The shape of the pressure diagram indicates even the direction in which the improvement is to be sought. If the negative loop is too short, the period of oscillation must be increased by adding length and/or volume. If the negative loop is too long, the period must be shortened by decreasing length and/or volume. If for each cylinder the negative loop ends at about exhaust closure, we have perfect tuning.

Taking of exhaust pressure indicator diagrams is not easy with conventional indicators. Mechanical weak-spring indicators are suitable only for relatively low speeds. An electromagnetic pickup specially fitted with a thin steel diaphragm may be employed attached to the exhaust pipe near the exhaust ports and connected to a cathode ray oscillograph.

The records obained with an oscillograph on the Evinrude engine mentioned hereinbefore check satisfactorily with the performance tests.

Nevertheless it was found that a cathode ray indicator is not very suitable for low pressure indication, especially because of the uncertainty of the pressure scale and zero line.

On the other hand the instrument of my invention has proven itself very satisfactory for indicating exhaust pressures. The drawings show my invention applied to a Diesel engine by way of example. It will be understood that the indicator of my invention is applicable to any type of engine. Reference character 1 designates generally a Diesel engine having an exhaust port designated generally at 2 and a drive shaft shown generally at 3. The indicator of my invention is arranged for coaction with the pressure in exhaust port 2 and the angular displacement of drive shaft 3. The indicator is shown mounted upon a base structure 4 upon which there is mounted the driving mechanism for the indicator which I have designated generally at 5. The base 4 provides mounting means for the vertically disposed framework 6 extending from base plate 7 to the header 8 with an intermediate transverse header 9 arranged thereon. Base plate 7 provides a support for the vertically extending tubular member 10 which is supported in a vertical position by means of a flange 11 suitably bolted as indicated at 12 to base plate 7. The opposite end of tubular member 10 terminates in a flange 14 which is secured to the undersurface of header 8 by suitable means such as bolts 15. Tubular member 10 is steadied and stabilized intermediate its ends by the transversely extending header 9 which is apertured at 16 for the passage of tubular member 10. An anti-friction thrust bearing 17 is connected by a bearing support 18 which is centered on supporting plate 7 within tubular member 10 for journalling the lower end of shaft 18. Shaft 18 extends vertically through tubular member 10 and is journalled at its upper end in anti-friction thrust bearing 19 supported in bearing holder 20 which is peripherally supported by the annular shoulder 21 in tubular member 10. The bearing holder 20 is substantially cup-shaped and is pinned in position with respect to the upper end of tubular member 10 by means of pin 22. The end of shaft 18 extends into the central portion of the cup-shaped bearing holder 20 and terminates in a splined end 23 which is secured to the rotary head 24 through coupling sleeve 25. The rotary head 24 is provided with lubricating annular grooves 24a, 24b and 24c which coact with the inner cylindrical wall of the cup-shaped bearing support 20 providing both a lubricating and pressure seal for the structure.

A cover plate 26 is secured to the top of header 8 by suitable means such as bolts 27 and is shaped to embrace the upper projecting end 28 of the rotary head 24. An oil cup 29 is secured through the cover plate 26 for distributing lubricant through the lubricating port 30 around the rotary head 24. To facilitate distribution of the lubricant the rotary head 24 is provided with a downwardly inclined annular shoulder 31 which coacts with the downwardly inclined peripheral portion 32 of the bearing holder 20 to direct the flow of lubricant between the cylindrical revolving surface of the rotary head 24 and the interior cylindrical surface of the bearing support 20. Thus lubricant is retained in annular rings 24a, 24b and 24c for imparting maximum lubricating and pressure sealing properties in the operation of the rotary head.

The rotary head 20 is provided with a single distributing passage indicated at 33 which extends radially of the rotary head and connects with an axial passage 34 leading through the sealing ring 35 carried in recess 36 in the end of the rotary head 24 and registering with the end of the pipe connection 37 which is screw threaded into the cover plate 26 as represented at 38. This single distributor passage 33 is arranged to register with spaced apertures arranged radially around the interior wall of the bearing support 20 and with aligned radial passages extending through the header 8. I have represented the radially arranged passages more clearly in Fig. 4 and have shown the aligned passages in section in Fig. 3 at 39 and 40 in the wall of the bearing support 20 and at 41 and 42 in the header 8.

In Fig. 4 I have shown these several radial passages in dotted lines in plan arrangement, the passages extending through the header 8 and equally spaced about the header in a manner identical with passages 41 and 42 shown in section in Fig. 3. These passages are equally spaced and separated through angular distances of, for example, 10° so that thirty-six such passages are provided throughout the 360° of engine shaft rotation. The bearing support 20 is also provided with radial passages corresponding to passages 39 and 40 which are aligned with the several passages in the distributor head corresponding to passages 41 and 42. Thus the pressure passage 34—33 in the rotating valve 24 may be selectively registered with the aligned sets of thirty-six passages 39—41 and 40—42 throughout the 360° of rotation, thereby distributing instantaneous engine pressures corresponding to engine shaft rotation to the multiplicity of manometer tubes designated at 43. Each of the manometer tubes 43 are U-shaped and have one of their ends communicating with an aligned radial passage. One end of each manometer tube is secured to a pipe 44 which depends downwardly from the aligned passage such as 41 or 42. A coupling 45 establishes a pressure-tight connection between the end of the U tube and the pipe 44. The ends of the radial passages 41, 42, etc., are closed by screw-threaded plugs 46, 47, etc., thereby directing the pressure distributed from the radial passages into the manometer tubes 43. The opposite ends of the U-shaped manometer tubes project through vertically disposed peripheral recesses 8a in distributor header 8 extending to positions above the header 8 and opening into the atmosphere as represented at 49.

Since mercury is too heavy for accurate reading of exhaust pressures, while water is too light for this size instrument, bromoform (specific gravity 2.87) is used, with a drop of methyl orange added for better visibility.

The manometer tubes are confined in position by means of a circular band or hoop 48 which fits around the periphery of the header 8. The band 48 carries a circular calibrated scale 50 thereon which is supported on annular shoulder 48a of band 48. The circular calibrated scale 50 is marked in degrees each 10° from 0° to 360° and is provided with arrow-like indicators 51 which are aligned with the manometer tubes and the scale set in position by means of the screw adjustment represented at 50a in Fig. 4. Thus an individual manometer tube is provided for indicating instantaneous pressures in phase with the engine crank rotation.

The connection from the pressure exhaust connection of the engine illustrated at 2 is completed through pipe 52 and couplings 53 and 54 to the pressure chamber 55. The pressure chamber 55 contains diaphragm 9 heretofore explained. The diaphragm 9 may be in the form of a thin rubber membrane or a corrugated disc or bellows-like device which serves to isolate the soot and gases from the engine exhaust which enter the portion of the chamber 55 represented at 56 from reaching the rotary valve 24 from that side of the pressure chamber 55 represented at 57. Thus the indicator mechanism may be operated indefinitely without deterioration from engine gases or soot which in the case of Diesel engines offers a substantial problem.

In order to maintain the phase relation between the rotation of the crank shaft and the selective connection of the manometer tubes with the chamber 57 subject to instantaneous pressure from the exhaust connection and insuring the instantaneous engine pressure for a predetermined angular displacement of the crank shaft, I arrange an indicator shaft 58 in anti- friction journals 59 and 60 supported by housing 61 connected with the vertically extending tubular member 10 as shown more clearly in Fig. 3. The indicator shaft 58 is steadied at one end in bearing support 62 and is coupled at the other end through coupling 63 with drive shaft 64. Drive shaft 64 is mounted in bearing members 65. Drive shaft 64 carries a sprocket wheel 66 thereon which is connected through sprocket chain 67 with sprocket wheel 68 driven by engine shaft 3.

The anti-friction bearings 59 and 60 are supported in the cylindrical housing 61 and constitute sets of ball bearings 69 and 70 confined in ball races disposed at opposite ends of the cylindrical housing 61. The ends of cylindrical housing 61 are closed by headers 71 and 72. Spacing bushings 73 and 84 are positioned over shaft 58 and serve to center the spiral drive gear 75. The spiral drive gear 75 meshes with the spiral gear 76 keyed to shaft 18 which drives the rotary valve 24. To facilitate observation of the condition of the gear box an observing window 77 may be provided in the cylindrical casing 61. Thus the angular displacement of the engine shaft is coordinated with the admission of instantaneous pressure to the successive manometer tubes for giving a progressive and dynamic characteristic to the engine under test.

Hand grips 78 and 79 are provided to facilitate mounting the apparatus in position adjacent the engine under test. Fig. 13 is a sample record obtained with the instrument which shows fairly good exhaust conditions for No. 3 cylinders, less good for No. 2 and poorest exhaust for No. 1 cylinder. The exhaust temperature reading was highest for No. 1 and lowest for No. 3 cylinder.

In examining the exhaust pressure records of multicylinder engines, it must be kept in mind that with a common exhaust header or manifold it is seldom possible to create perfect tuning for each cylinder, as the exhaust impulses necessarily intermingle and the exhaust of one cylinder even "backfires" into the open exhaust of another cylinder which succeeds the former in firing order. Various methods are being used to minimize the effect of undesirable pressure fluctuations in the common header of multicylinder engines, by properly placed mufflers and silencers, tapered exhaust nipples and other arrangements calculated to dissipate the pressure energy of the exhaust, and prevent it from interfering with the scavenging process. The exhaust conditions in a multicylinder engine with a common exhaust header are, therefore, never ideal. One must be satisfied if the exhaust pressure indicator shows the absence of high instantaneous pressures in the exhaust ducts during the respective scavenging period.

In order to effectively tune a multicylinder engine, individual exhaust pipes of tuned lengths must be mounted between the individual cylinders and the common header or exhaust pot. As an alternative, two or three cylinders may exhaust into a single exhaust pipe, provided the firing order is such that the exhaust periods of the cylinders, exhausting into a common pipe do not overlap.

Although I have shown the manometer tubes arranged circularly, I wish it understood that these tubes can be arranged in the same plane and connected through the phasing valve with the engine. Thus the cyclic rise and fall of pressures in the engine cylinder can be studied according to angular progressive displacement of the crank shaft. Design features of the engine can then be modified and changed to provide operating efficiency.

The indicator is equally applicable to air and gas compressors, blowers and other machines where cyclic pressure changes occur in such a manner that the cyclicly recurring instantaneous pressures at any one point are determined by the phase angle of a rotating shaft.

While I have described my invention in its preferred arrangement, I realize that changes in details of construction and use may be made and accordingly I desire that it be understood that no limitations upon my invention are intended other than may be imposed by the scope of the appended claims.

What I claim and desire to secure by Letters Patent of the United States is as follows:

1. Apparatus for determining engine characteristics comprising in combination with an engine drive shaft and the exhaust connection of an engine, a multiplicity of pressure measuring devices and means for selectively connecting said pressure measuring devices successively with said exhaust connection in progressive relation to the angular displacement of said engine drive shaft.

2. Apparatus for determining engine characteristics comprising in combination with the drive shaft and exhaust connection of an engine, a multiplicity of manometer tubes and means for successively connecting said manometer tubes with the exhaust connection of the engine in progressive relation to the angular displacement of said engine drive shaft for visually indicating on said manometer tubes the instantaneous pressure conditions existing in said engine with relation to the angular displacement of the engine drive shaft.

3. Apparatus for indicating engine characteristics comprising in combination with the drive shaft and exhaust connection of the engine, a row of manometer tubes, a phase valve and means for driving said phase valve in proportion to the angular displacement of the engine drive shaft for selectively connecting said manometer tubes with the exhaust connection of the engine for rendering exhaust pressure from said engine effective with respect to the successive manometer tubes for indicating on said manometer tubes instantaneous pressure conditions existing in said engine for predetermined angular displacement of the engine drive shaft.

4. Apparatus for indicating engine characteristics comprising in combination with the exhaust connection and drive shaft of an engine, a multiplicity of pressure indicating devices disposed in spaced positions in proportion to angular displacement of the engine shaft, a phase valve disposed between said pressure indicating devices and said engine exhaust connection and means for driving said phase valve proportionally to angular displacement of said drive shaft for selectively rendering effective pressure from said engine exhaust connection upon each of said pressure indicating devices in succession for visually indicating the instantaneous exhaust pressure condition for predetermined angular displacement of said engine drive shaft.

5. Apparatus for indicating engine characteristics comprising in combination with the exhaust connection and drive shaft of an engine, a frame for supporting a multiplicity of manometer tubes, said frame including a distributor head having a multiplicity of pressure passages therein selectively connected with individual manometer tubes, a phasing valve common to all of said pressure passages, a connection extending from the engine exhaust connection for rendering effective the exhaust pressure upon said phasing valve and means for driving said phasing valve in timed relation to the angular displacement of the engine drive shaft for establishing selective connection between said phasing valve and said pressure passages for delivering to the manometer tubes in succession instantaneous pressures proportional to the angular displacement of the engine drive shaft.

6. Apparatus for determining engine characteristics comprising in combination with the exhaust connection and drive shaft of an engine, a multiplicity of manometer tubes, a plurality of pressure passages selectively connecting said manometer tubes to a common pressure distributing position, a rotatable valve, means for rotatably driving said valve in proportion to angular displacement of said drive shaft, a pressure connection between the exhaust connection of the engine and said rotatable valve whereby said manometer tubes indicate instantaneous successive pressures existing in said exhaust connection for predetermined angular displacement of the engine drive shaft.

7. Apparatus for indicating engine characteristics comprising a frame supported adjacent the exhaust connection and drive shaft of an engine, a shaft member journaled with respect to said frame and rotatably driven from the drive shaft of the engine, a rotatable valve driven from said shaft member, said valve including a radially disposed pressure distributing passage therein, means for impressing instantaneous pressures from the exhaust connection of the engine through said pressure passage, a multiplicity of radially extending pressure passages aligned with the pressure passage in said rotatable valve and manometer tubes individual to each of said radial passages for receiving pressure distributed from said rotatable valve and visually indicating on said manometers the instantaneous pressure conditions proportional to the angular displacement of the engine shaft.

8. Apparatus for indicating engine characteristics comprising a frame structure supportable adjacent the exhaust connection and drive shaft of an engine, a vertically extending shaft journaled in said frame structure, a connection adjacent one end of said shaft with the drive shaft of the engine, a bearing support adjacent the other end of said vertically extending shaft, a rotatable valve carried on said vertically extending shaft and rotatable with respect to said bearing support, a distributor head mounted by said frame and having a multiplicity of radially extending pressure passages therein, manometer tubes supported by said distributor head, one of said manometer tubes being individually connected with each of said radially extending pressure passages, a pressure passage through said rotatable valve operative to be successively aligned with said radially extending passages in accordance with the angular displacement of the engine shaft and means for impressing upon the pressure passage in said rotatable valve instantaneous pressures from the exhaust connection of the engine.

9. Apparatus for indicating engine characteristics comprising a frame structure supportable adjacent the exhaust connection and drive shaft of an engine, a vertically extending shaft journaled in said frame structure, a connection adjacent one end of said shaft with the drive shaft of the engine, a bearing support adjacent the other end of said vertically extending shaft, a rotatable valve carried on said vertically extending shaft and rotatable with respect to said bearing support, a distributor head mounted by said frame and having a multiplicity of radially extending pressure passages therein, manometer tubes supported by said distributor head, one of said manometer tubes being individually connected with each of said radially extending pressure passages, a pressure passage through said rotatable valve operative to be successively aligned with said radially extending passages in accordance with the angular displacement of the engine shaft, means for impressing upon the pressure passage in said rotatable valve instantaneous pressures from the exhaust connection of the engine and calibrations adjacent said manometer tubes for indicating the spacing thereof in proportion to the angular displacement of the engine shaft whereby visual indications are produced in said manometer tubes of the instantaneous pressure conditions existing for each of the angular displacements of the engine shaft.

10. Apparatus for indicating engine characteristics comprising a frame structure supportable adjacent the exhaust connection and drive shaft of an engine, a vertically extending shaft journaled in said frame structure, a connection adjacent one end of said shaft with the drive shaft of the engine, a bearing support adjacent the other end of said vertically extending shaft, a rotatable valve carried on said vertically extending shaft and rotatable with respect to said bearing support, a distributor head supported by said frame and having a multiplicity of radially extending pressure passages therein, manometer tubes supported by said distributor head, one of said manometer tubes being individually connected with each of said radially extending pressure passages, a pressure passage through said rotatable valve operative to be successively aligned with said radially extending passages in accordance with the angular displacement of the engine shaft, a connection between said rotatable valve and the exhaust connection of the engine and a diaphragm interposed between the exhaust connection of the engine and the rotatable valve for excluding soot and exhaust gases from the rotatable valve.

11. Apparatus for indicating engine characteristics comprising a frame structure supportable adjacent the exhaust connection and drive shaft of an engine, a vertically extending shaft journaled in said frame structure, a connection adjacent one end of said shaft with the drive shaft of the engine, a bearing support adjacent the other end of said vertically extending shaft, a rotatable valve carried on said vertically extending shaft and rotatable with respect to said bearing support, a distributor head mounted by said frame and having a multiplicity of radially extending pressure passages therein, manometer tubes supported by said distributor head, one of said manometer tubes being individually connected with each of said radially extending pressure passages, a pressure passage through said rotatable valve operative to be successively aligned with said radially extending passages in accordance with the angular displacement of the engine shaft, a connection between said pressure passage and the exhaust connection of the engine and means for excluding from said rotatable valve discharge gases from the exhaust connection of said engine.

12. Apparatus for indicating engine characteristics comprising in combination with the exhaust connection and drive shaft of an engine, a frame structure supported adjacent the engine drive shaft and exhaust connection, an indicator drive shaft, anti-friction bearings for mounting said indicator drive shaft in said frame structure, a connection between said indicator drive shaft and said engine shaft, a vertically disposed shaft driven by said indicator shaft, means for journaling said vertically disposed shaft including a cup-like bearing support terminating in an annular wall portion inwardly inclined at its periphery, a rotatable valve carried by said vertically disposed shaft and rotatable within said cup-like bearing support, said rotatable valve having a downwardly inclined annular shoulder directed toward the inwardly inclined peripheral portion of said bearing support, a housing for said valve, means for delivering lubricant to said rotatable valve for collection and distribution intermediate the adjoining downwardly inclined surfaces of said bearing support and said rotatable valve, a multiplicity of pressure indicating devices carried by said support, a connection from the exhaust of the engine for rendering instantaneous engine pressure effective through said rotatable valve and means for selectively distributing the instantaneous engine pressures through said valve to said pressure indicators for indicating instantaneous engine pressures proportional to annular displacement of the engine drive shaft.

13. Apparatus for indicating engine characteristics comprising a vertically extending frame supportable adjacent the exhaust connection and drive shaft of an engine, a multiplicity of manometer tubes carried by said frame and arranged in substantially cylindrical contour proportional to degrees of angular displacement of the engine shaft, pressure conveying means extending between said manometer tubes and the exhaust connection of the engine and means driven by the engine shaft for selectively distributing instantaneous exhaust pressures to the successive manometer tubes according to angular displacements of the engine shaft.

PAUL H. SCHWEITZER.

REFERENCES CITED

The following references are of record in the file of this patent:

UNITED STATES PATENTS

| Number | Name | Date |
|---|---|---|
| 1,349,346 | Roos | Aug. 10, 1920 |
| 1,692,513 | Newell | Nov. 20, 1928 |
| 1,982,659 | Groff | Dec. 4, 1934 |
| 2,070,842 | Reichel et al. | Feb. 16, 1937 |